United States Patent Office 3,558,340
Patented Jan. 26, 1971

3,558,340
PROCESS FOR COATING MODELLING CLAY AND PRODUCT PRODUCED THEREBY
Herman Spector, 75 Central Park W.,
New York, N.Y. 10023
No Drawing. Filed Jan. 18, 1968, Ser. No. 698,707
Claims priority, application Great Britain, Jan. 20, 1967, 3,034/67
Int. Cl. B44c *3/04;* B44d *1/094, 1/26*
U.S. Cl. 117—26                    7 Claims

ABSTRACT OF THE DISCLOSURE

Process for hard coating and rendering permanent, objects of non-hardening oil based clay, and the product produced thereby, wherein oil base modelling clay is given a hard coat by rubbing a dry powder of wood flour and plaster of paris thereon, painting the surface with a mixture of this powder and polyvinyl acetate, and allowing the painted surface to cure. If desired, a metallic coating may be provided by further painting on a coating of a fine metal powder suspended in polyvinyl acetate.

BACKGROUND OF THE INVENTION

This invention relates to a process for hard coating and rendering permanent objects of non-hardening oil based clay.

Modelling clays of the commercial type, known in the market as Plastina, Plasticine, or the like, are composed of fine clay suspended in oil or wax rather than water to render it more or less permanently pliable. This clay has many advantages in that it does not dry out so that a sculptor or other worker may work at his convenience without his workpiece drying out as in the case with water based clays. However, a piece of sculpture or the like made from oil based clay must be passed through additional time consuming and expensive processes to render it permanent. Usually it has to be cast in a plaster or rubber mold and then recast in some permanent medium. This invention allows a sculpture or other workpiece of oil based clay, to be hard coated and rendered permanent. As used herein, the term oil based clay is intended to include wax and wax and oil based clays.

SUMMARY OF THE INVENTION

Oil based modelling clay is coated by the steps of rubbing into the surface of the clay a fine powder mixture of wood flour (wood flour includes herein and in the following claims pulverized and microporous cellulose) and plaster of Paris, painting the clay surface with a mixture of the above powder and polyvinyl acetate, and allowing the painted surface of the clay to cure. The cured surface of the clay may then be painted conventionally or a metallic coating may be provided by further painting the clay surface with a mixture of fine metal powder suspended in polyvinyl acetate.

DESCRIPTION OF THE PREFERRED EMBODIMENTS

Step #1

An art object or the like is modelled from an oil based clay such as Plasticine. These clays are well known by sculptors, students, hobbyists, and other workers as non-hardening, non-drying pliable materials.

Step #2

A powder is prepared by mixing a fine wood flour of IRS #50 fineness with fine plaster of Paris. The powders should be mixed in a ratio of about equal amounts by volume for best results. The clay object to be coated is completely dusted with the powder mixture which is rubbed into the surface with a resilient object or by the fingers. Any remaining loose powder not rubbed into the clay surface is brushed off with a soft hair brush.

Step #2 has been tried using talc, starch, and other fillers for the wood flour and with tile grout, cement, lime, and plastic urea resins in place of the plaster of Paris. These substitutes were used in various combinations, alone and mixed with each other, without satisfactory results. The use of a mixture of wood flour and plaster of Paris gives a hard, dry, tough, non-pliable, non-oily base which gives a clay object the ability to be further coated.

Step #3

From 25 to 50 parts by volume of the above mixture and 100 parts by volume of polyvinyl acetate diluted with water to the consistency of milk are mixed together in a small container. The liquid mixture is rapidly applied to the coated clay surface of Step #2 and allowed to dry or cure. The liquid is best applied with a soft hair brush although it could also be sprayed. Curing time is usually completed in a few minutes. For particularly fine detail work, two or more thin coats are best applied allowing a few minutes for each coat to cure. When dry, all details, hair lines, creases, and indentations in sculptured objects are brought out and highlighted.

Acrylic, casein, and other water soluble resins were substituted for the polyvinyl acetate solution used in Step #3; however, the results were not satisfactory.

At the conclusion of Step #3, the clay object has a hard coat and is in a permanent form. If desired, it may be further finished by painting with clear or colored urethane finish, lacquer, shellac, varnish, or other hard drying material. In addition, metal powders, such as gold or bronze, many be applied mixed as a suspension in a lacquer or other vehicle. For a less smooth surface, the metal powder may be applied in the liquid mixture of Step #3. This provides a more textured surface. Colored over coatings may be painted over the metallized finish and wiped off while still wet to allow desired metallic highlights to appear. When completed, a coated clay object may be waxed for additional protection.

The following additional steps may be followed if it is desired to give the coated object a metal plated appearance.

Step #4

Apply a hard clear coating, as described above, of lacquer, shellac, varnish, or the like.

Step #5

Mix a dry powder of one part plaster of Paris, one part wood flour, and six parts fine metal powder. Mix this dry powder with an equal part by volume of polyvinyl acetate solution diluted with water and rapidly brush the resulting mixture with long steady strokes onto the coated clay object. This mixture hardens rapidly and requires that the brush and the mixing container be washed after each use in water. Several such coats will provide a harder and more dense metallic coating.

Step #6

If a bronze coating was applied in Step #5, dilute ammonium sulphide may be applied to give a brown or black patina. To get bronze highlights through the patina, the coated clay object may be lightly burnished with fine sandpaper. In a like manner, green to turquoise patinas may be provided by applying or brushing on dilute cupric nitrate, dilute ammonium acetate, dilute cupric carbonate, or dilute sodium thiosulphate and ferric nitrate. After burnishing, the metal coated clay object may be waxed and polished with a soft cloth.

When skillfully carried out, an oil based clay sculpture coated according to this invention will give the appearance of a bronze casting and will be a permanent art object.

What is claimed is:

1. The process of coating an object of oil or wax based modelling clay comprising the steps of:
   (a) preparing a dry powder mixture of wood flour and plaster of Paris;
   (b) dusting the clay object with the dry powder mixture;
   (c) rubbing the dry powder mixture dusted onto the clay object into its surface;
   (d) removing excess powder from the surface of the powder coated clay object;
   (e) preparing a liquid mixture of wood flour and plaster of paris in water with polyvinyl acetate.
   (f) painting the surface of the powder coated clay object with the liquid mixture; and
   (g) allowing the painted surface to cure providing a hardened coating and permanence for the coated clay object.

2. The process according to claim 1 wherein in steps (a) and (e) wood flour and plaster of Paris are mixed in substantially equal parts by volume.

3. The process according to claim 2 wherein successive coats of the liquid mixture are painted on the surface of the clay object and allowed to cure between coats.

4. The process according to claim 2 with the additional step of further finishing the coated object by painting it with a conventional hard drying covering.

5. The process according to claim 2 with the additional steps of:
   (h) preparing a second liquid mixture of a fine metal powder in water with polyvinyl acetate;
   (i) painting the clay object with the second liquid mixture; and
   (j) allowing the painted surface to cure.

6. The process according to claim 5 wherein the fine metal powder is bronze and with the additional steps of:
   (k) chemically forming a patina on the metal covered surface of the clay object; and
   (l) burnishing the patina revealing the metal surface therebelow where desired.

7. A product made by the method of claim 1.

References Cited

UNITED STATES PATENTS

| | | | |
|---|---|---|---|
| 2,213,784 | 9/1940 | Landow | 35—26 |
| 2,743,535 | 5/1956 | Hanks | 35—26X |
| 2,755,587 | 7/1956 | Hirst | 35—26X |
| 2,831,286 | 4/1958 | Eisner | 35—26X |

OTHER REFERENCES

Harbutt's "Plastic Method and the Use of Plasticine," 1898, pp. 8–9 and 14–19.

"Useful Arts and Handicrafts," Leland et al., 1902, pp. 263–264.

WILLIAM D. MARTIN, Primary Examiner

R. M. SPEER, Assistant Examiner

U.S. Cl. X.R.

117—16, 29, 71; 264—131, 133